Dec. 15, 1931. G. G. WESTHOFF 1,837,141
SAW ATTACHMENT FOR TRACTORS
Filed April 7, 1931 4 Sheets-Sheet 2
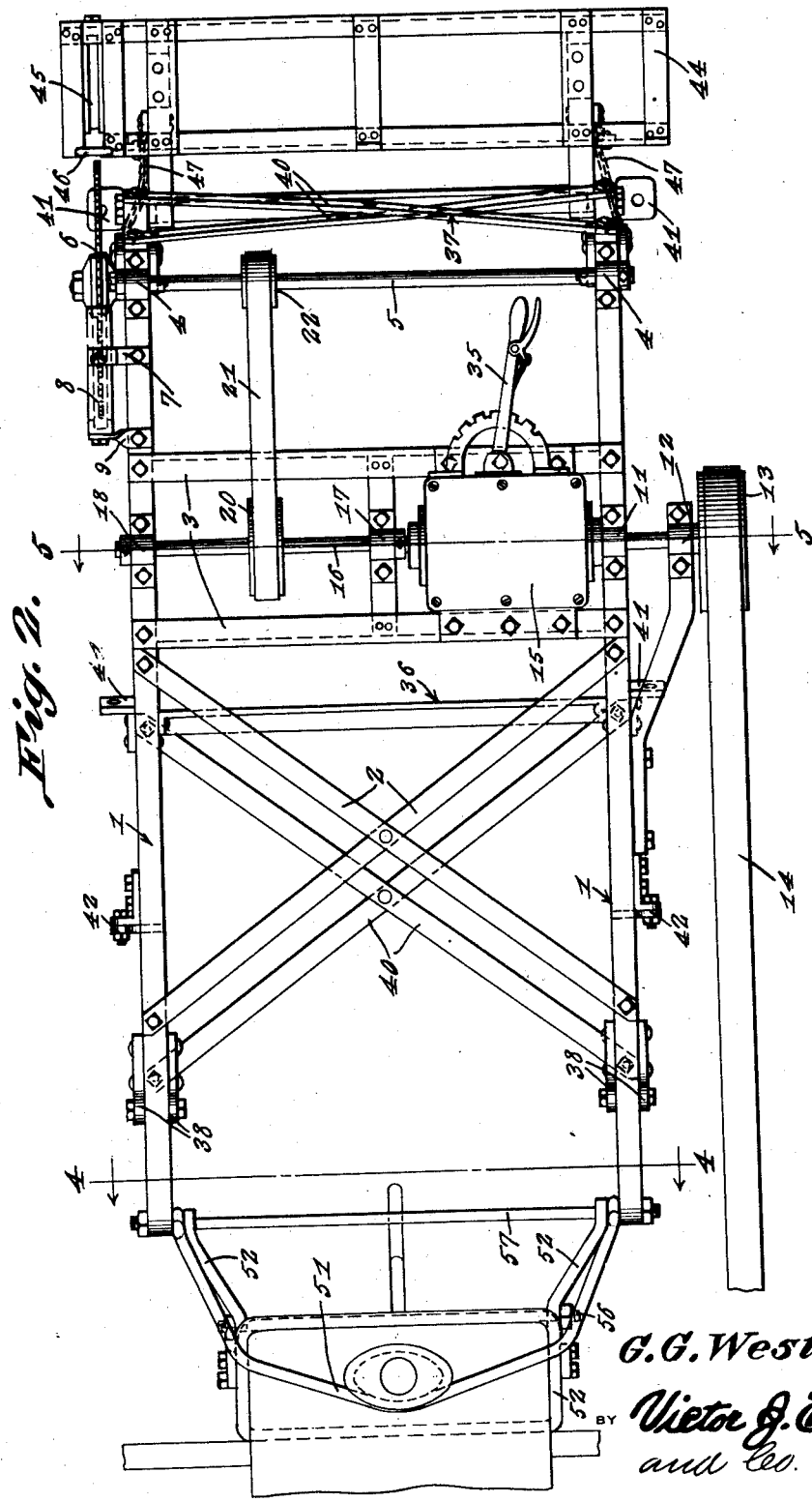
G.G. Westhoff,
INVENTOR
BY Victor J. Evans
and Co. ATTORNEYS Dec. 15, 1931.                G. G. WESTHOFF                1,837,141
                         SAW ATTACHMENT FOR TRACTORS
                            Filed April 7, 1931        4 Sheets-Sheet 3
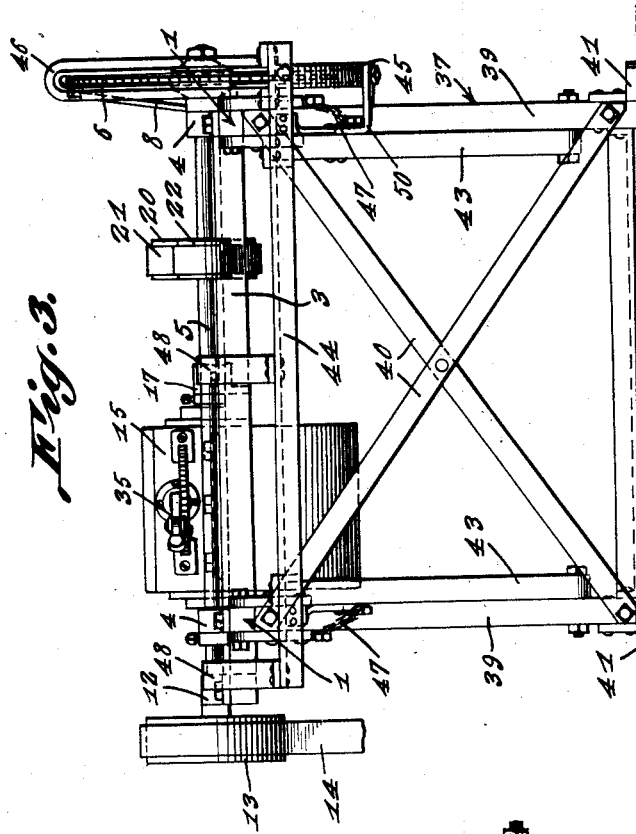
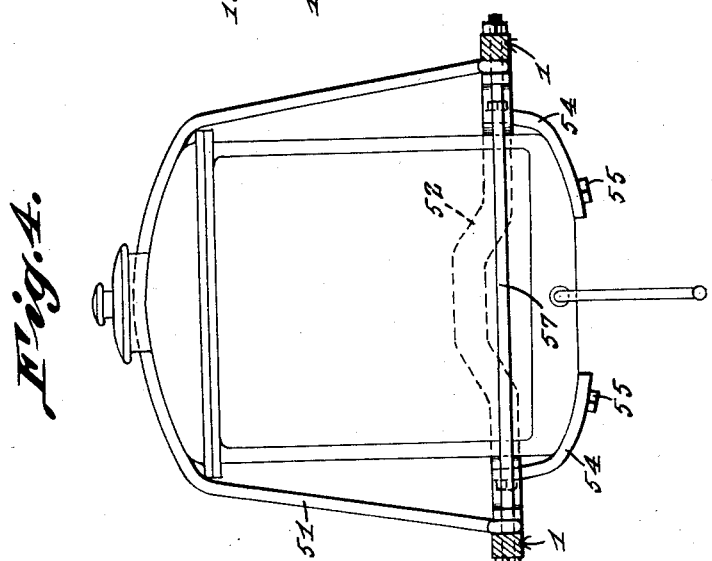
G. G. Westhoff,
INVENTOR
BY Victor J. Evans
and Co.          ATTORNEYS Dec. 15, 1931.   G. G. WESTHOFF   1,837,141
SAW ATTACHMENT FOR TRACTORS
Filed April 7, 1931    4 Sheets-Sheet 4
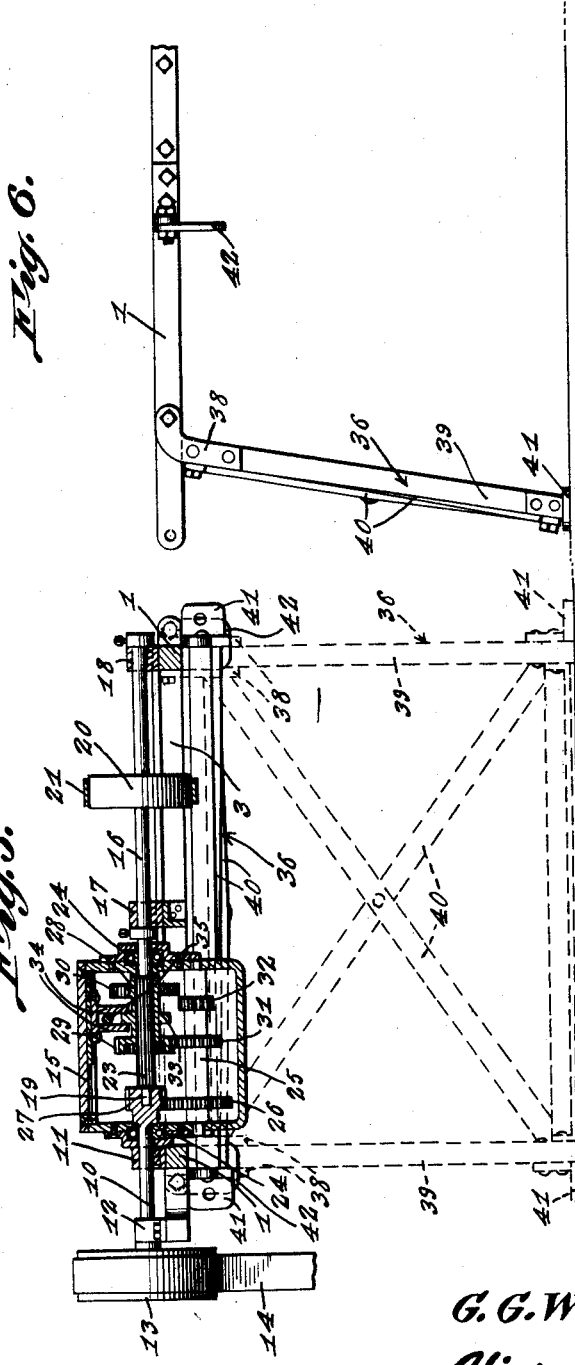
G. G. Westhoff,
INVENTOR
BY Victor J. Evans
and Co.
ATTORNEYS Patented Dec. 15, 1931

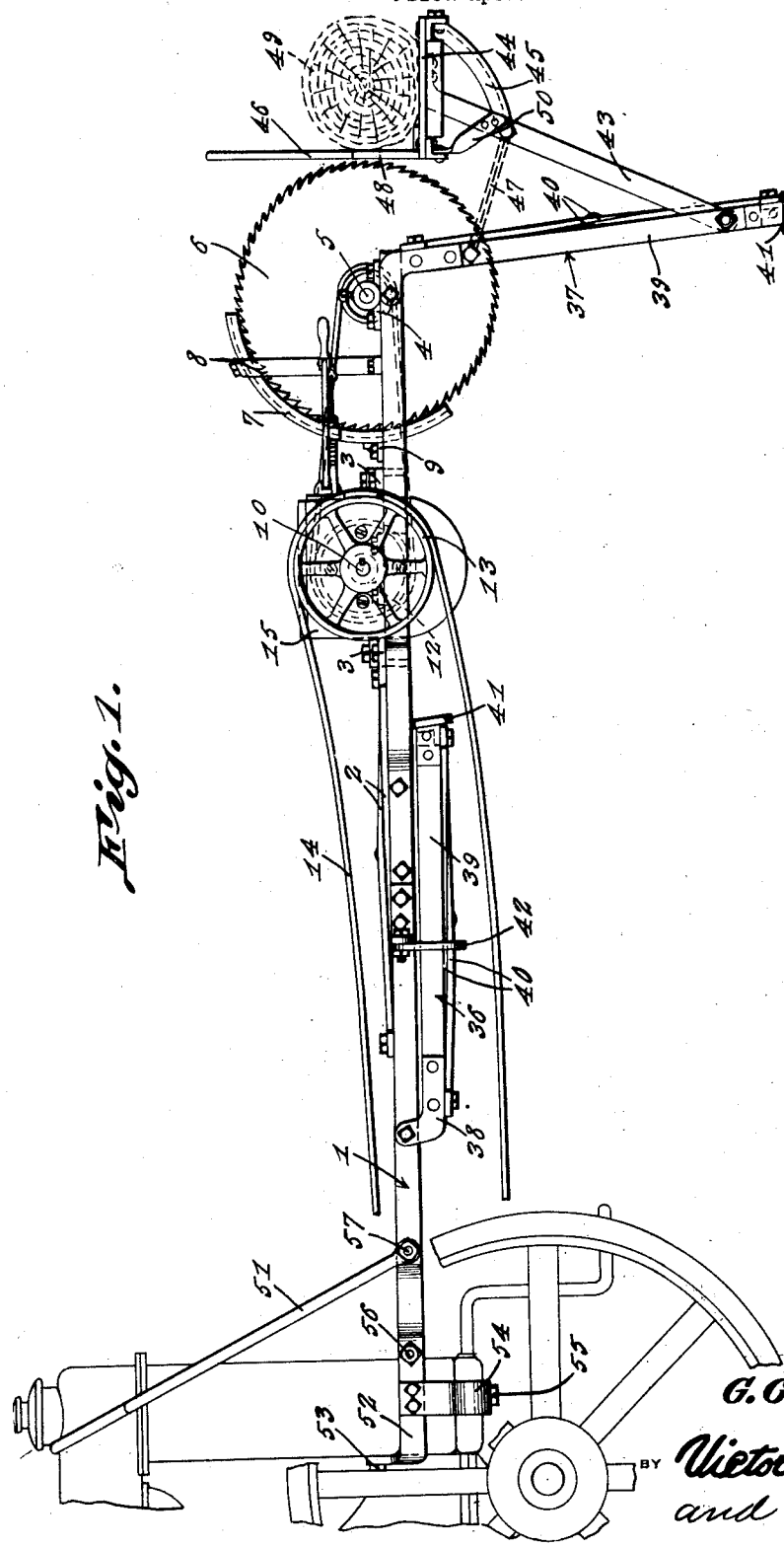

1,837,141

UNITED STATES PATENT OFFICE

GEORGE G. WESTHOFF, OF LE MARS, IOWA

SAW ATTACHMENT FOR TRACTORS

Application filed April 7, 1931. Serial No. 528,397.

This invention relates to a saw attachment for tractors and it consists in the novel features hereinafter described and claimed.

The object of the invention is to provide an improved sawing attachment especially adapted for use on a Fordson tractor; to provide improved means for attaching the device to the tractor; to provide means for permitting of elevating the attachment when desired; to provide novel means for readily detaching and attaching the device to the radiator of the tractor.

A further object of the invention is to provide a novel combination and arrangement of parts as hereinafter described and as disclosed in the drawings.

In the accompanying drawings:—

Figure 1 is a side elevational view of the saw showing the same attached to the radiator of a tractor.

Figure 2 is a top plan view of the same.

Figure 3 is an end elevational view therof.

Figure 4 is a transverse sectional view cut on the line 4—4 of Figure 2 and looking in the direction indicated by the arrows upon said line.

Figure 5 is a similar view cut on the line 5—5 of Figure 2.

Figure 6 is a side elevational view of the inner end portion of the saw attachment.

As illustrated in the accompanying drawings the frame of the saw attachment consists of side rails 1 which are connected together by cross braces 2 and cross rails 3. Bearings 4 are mounted at the outer ends of the side rails 1 and a mandrel 5 is journaled in the bearings 4. A disk saw blade 6 is mounted upon one end of the mandrel 5 in a usual manner. A saw guard 7 is disposed over the rear portion of the blade 6 and is held in proper position upon one of the side rails 1 by means of a support 8 and lug 9.

A drive shaft 10 is journaled in bearings 11 and 12 and carries a belt pulley 13 around which is trained a driving belt 14. The belt 14 is also designed to be trained around the driving pulley on the shaft of the tractor engine (not shown) in a usual manner. The inner end of the drive shaft 10 enters a casing 15 which is mounted upon certain of the cross rails 3 which connect the side rails 1 together. A driven shaft 16 is journaled in bearings 17 and 18 and is alined longitudinally with the drive shaft 10, the inner end of the driven shaft 16 being received in a socket at the corresponding end of the drive shaft as shown at 19 in Figure 5 and in a usual manner. A belt pulley 20 is mounted upon the driven shaft 16 and a belt 21 is trained around the pulley 20 and a pulley 22 mounted upon the mandrel 5. The shaft 16 is provided at its inner ends with a set of elongated gear teeth 23. The inner end of the shaft 16 also enters the casing 15 and both the shafts 10 and 16 are journaled in ball bearings 24 provided at the ends of the casing 15. A stub shaft 25 is journaled in the lower portion of the casing 15 and a gear wheel 26 is mounted upon said stub shaft and meshes with a gear wheel 27 mounted upon the drive shaft 10.

A sleeve 28 is slidably mounted upon the elongated set of gear teeth 23 and is provided with spaced gear wheels 29 and 30 which are adapted to mesh with gear wheels 31 and 32 respectively upon the stub shaft 25. The gear wheel 30 is of greater diameter than the gear wheel 29 and the gear wheel 31 is of greater diameter than the gear wheel 32. These gear wheels engage each other at different times and hence when the sleeve 28 is slid upon the teeth 23 to bring the teeth of one or the other of the said set of gear wheels in mesh the shaft 16 is driven at different rates of speed in a usual manner. The sleeve 28 is provided at a point between the gear wheels 29 and 30 with an annular collar 33 which is received between the arms of a fork 34 carried at the inner end of a lever 35 which is fulcrumed at the side of the casing 15 and passes through the said side. Hence it will be seen that as the lever 35 is swung the engagement of the fork 34 with the collar 33 will cause the sleeve 28 to move longitudinally along the set of gear teeth 23. Thus means are provided for manually shifting the sleeve 28 so that the shaft 16 may be rotated at the desired rate of speed.

Leg frames 36 and 37 are pivotally connected within the side rails 1, the leg frame 37 being located at the extreme outer ends of the side rails and the leg frame 36 being located at a point spaced from the inner ends of the side rails 1 as best shown in Figure 1 of the drawing. As the leg fames 36 and 37 are both alike a description of one will answer for both. Each leg frame includes angle plates 38 which are applied to the opposite sides of leg members 39 and which are pivoted at their upper ends to the opposite sides of the side rails 1. The leg members 39 are connected together by cross braces 40 and each leg member 39 is provided at its free end with an outstanding foot member 41. When the leg frame 36 is swung up to the position as shown in Figure 1 of the drawing it is secured by hooks 42 which are pivoted at the outer sides of the side rails 1 and which engage under the intermediate portions of the leg member 39 of the said leg frame. When desired the hooks 42 may be swung from under the leg members of the frame 36 and the said frame may swing down so that the upper ends of the leg member 39 will abut against the under side of the side rails 1 and thus means are provided for firmly supporting the side rails upon the surface of the ground. Table legs 43 are pivoted to the lower portions of the leg members 39 of the leg frame 37 and a table 44 is attached to the upper ends of the table legs 43 as shown in Figure 1. A saw guide 45 is mounted at the end of the table 44 as shown in Figure 2 and the saw blade 6 is adapted to enter the saw guide 45 when the table is swung toward the saw blade. A saw guard 46 is mounted upon the guide 45 and is adapted to pass over the upper edge of the saw blade 6 when the table is swung towards the saw. Chain sections 47 are connected at one end with the legs 39 of the leg frame 37 and at their other ends with the upper portions of the table legs 43 and serve to limit the outward movement of the table and table legs. An upstanding log guide 48 is mounted at the inner edge of the table 44 and serves as a guide for the log 49 which rests upon the table and which is indicated in Figure 1 of the drawings. Braces 50 are connected with the opposite edge portions of the table 44 and the upper portions of the table legs 43 and serve to hold the table 44 at a proper angle with relation to the table legs 43.

Assuming that the parts are in the position as shown in Figure 1 of the drawings and the saw blade 6 is rotating the operator who is attending the lever 35 swings the table 44 with the log thereon toward the saw and the saw enters the guide 45 and cuts a section from the log. The table and the table legs are swung manually toward the saw blade but the table will return to its normal position when the side rails 1 are horizontally disposed as shown in Figure 1 of the drawings.

The means for connecting the side rails 1 with the radiator of the tractor includes a yoke bar 51 adapted to extend across the top of the radiator behind the top thereof as shown in Figures 1 and 2 of the drawings and a yoke bar 52 which passes around the sides of the radiator and across the back thereof and which is secured by means of a bolt 53 to the back of the radiator. Cleats 54 are attached to the end portions of the yoke bar 52 and extend under the radiator and are secured thereto by means of bolts 55. A cross rod 56 is disposed across the front of the radiator and its ends pass through the side portions of the yoke bar 52. The ends of the yoke bars 51 and 52 register with each other and a cross rod 57 passes through the registering ends of the said yoke bars and also through the inner ends of the side rails 1 so that the side rails are pivotally connected with the forward ends of the yoke bars and the yoke bars are securely held together and firmly mounted upon the radiator of the tractor.

When the device is not in use and the tractor is used for transporting the same from one point to another the side rails 1 are swung up upon the cross rods 57 after the leg frame 36 has been secured by the hooks 42. At the same time the leg frame 37 swings down and the table legs 43 swing over toward the leg frame 37 and all parts of the attachment are elevated and folded together so that the tractor may move freely. When it is desired to set the attachment up it is necessary only to lower the free ends of the side rails 1 and in doing so the leg frame 37 and the table legs 43 will assume the position as shown in Figure 1 of the drawings. When the sawing operation is being carried on the leg frame 36 is lowered so that the side rails 1 are supported at their opposite ends upon the ground and this relieves the attaching means which connect the side rails with the radiator from vibration.

Having described the invention what is claimed is:—

A sawing attachment for a tractor comprising side rails rigidly connected together and pivotally connected with the attaching means, leg frames pivotally connected with the side rails, a saw journaled upon the side rails, a change speed mechanism mounted upon the side rails and having a shaft operatively connected with the saw, means for operating the change speed mechanism, and a table pivoted upon the legs and adapted to swing toward the saw said change speed operating means being located adjacent and disposed toward said table.

In testimony whereof I affix my signature.

GEORGE G. WESTHOFF.